US009585232B1

(12) United States Patent
O'Neil et al.

(10) Patent No.: US 9,585,232 B1
(45) Date of Patent: Feb. 28, 2017

(54) TWO CIRCUIT LIGHTING CONTROLLER WITH SENSORS AND RF REMOTE

(71) Applicants: Tom O'Neil, Torrance, CA (US); Lee Chiang, Sylmar, CA (US); Ji Wenshu, El Monte, CA (US)

(72) Inventors: Tom O'Neil, Torrance, CA (US); Lee Chiang, Sylmar, CA (US); Ji Wenshu, El Monte, CA (US)

(73) Assignee: EUCONTROLS CORPORATION

( * ) Notice: Subject to any disclaimer, the term of this patent is extended or adjusted under 35 U.S.C. 154(b) by 0 days.

(21) Appl. No.: 14/975,319

(22) Filed: Dec. 18, 2015

(51) Int. Cl.
*H05B 37/02* (2006.01)

(52) U.S. Cl.
CPC ..... *H05B 37/0272* (2013.01); *H05B 37/0218* (2013.01); *H05B 37/0227* (2013.01); *H05B 37/0236* (2013.01)

(58) Field of Classification Search
CPC H05B 37/02; H05B 37/0272; H05B 37/0218; H05B 37/0227; H05B 37/0236; H05B 37/0245
See application file for complete search history.

(56) References Cited

U.S. PATENT DOCUMENTS

| | | | | |
|---|---|---|---|---|
| 5,699,243 A | * | 12/1997 | Eckel | H05B 37/0227 315/159 |
| 6,255,946 B1 | * | 7/2001 | Kim | G08B 13/184 250/221 |
| 6,888,323 B1 | | 5/2005 | Null et al. | |
| 7,155,317 B1 | * | 12/2006 | Tran | H05B 37/0227 307/117 |
| 7,411,489 B1 | | 8/2008 | Elwell et al. | |
| 8,373,125 B2 | * | 2/2013 | Ni | H05B 37/0227 250/340 |
| 8,844,361 B2 | | 9/2014 | Joyce | |
| 8,901,496 B2 | | 12/2014 | Aurongzeb et al. | |
| 8,981,299 B2 | * | 3/2015 | Soccoli | H05B 37/0227 250/339.14 |
| 2011/0109164 A1 | * | 5/2011 | Mohammed Suhura | H02J 9/065 307/66 |
| 2013/0293877 A1 | * | 11/2013 | Ramer | H05B 33/0842 356/213 |

\* cited by examiner

*Primary Examiner* — Thai Pham
(74) *Attorney, Agent, or Firm* — Clement Cheng

(57) ABSTRACT

A lighting controller comprising a single circuit sensor switch on a first circuit. At least one infrared PIR sensor is configured to cover 360 degrees. The at least one infrared PIR sensor is electrically connected to control the single circuit sensor switch. An acoustic sensor is electrically connected to control the single circuit sensor switch. A photo sensor is electrically connected to control the single circuit sensor switch. The photo sensor has an infrared remote controller and receiver for controlling the single circuit sensor switch. A second circuit sensor switch is on a second circuit that is connected to the first sensor. The second circuit sensor switch is configured to be connected to the single circuit sensor switch, the photo sensor, the acoustic sensor, and the at least one infrared PIR sensor so that the second circuit sensor switch further improves lighting efficiency.

16 Claims, 6 Drawing Sheets

TWO CIRCUIT LIGHTING CONTROLLER WITH SENSORS AND RF REMOTE

DISCUSSION OF RELATED ART

Traditionally, lighting has had relatively low efficiency. More recently, improved technology and legal regulatory requirements have created an increased demand for high-efficiency functionality in the field of general area lighting. For example, on Jul. 1, 2014, California Title 24 2013 (CA T24) Building Energy Efficiency Standard went into effect which requires high efficacy (Lumens per Watt) and also requires that low efficacy lighting without dimming capabilities must be separately controlled in order to be in compliance with California Title 24. Traditional lighting controllers with built-in sensors and timers can control only a single circuit. A typical microcontroller with proprietary firmware reads the sensor(s) information and controls the timing of the switched AC power source to a single lighting circuitry.

A variety of different improvements in the prior art have led to improved efficiency. For example, in U.S. Pat. No. 8,901,496 entitled Overhead Occupancy Sensor by Aurongzeb assigned to General Electric Co., issued Dec. 2, 2014, the disclosure of which is incorporated herein by reference, an overhead occupancy sensor has an adjustable mounting. Also, in U.S. Pat. No. 8,844,361 entitled Ultrasonic Sensor Control System For Occupancy Sensing by inventor Joyce, assigned to Watt Stopper Inc., the disclosure of which is incorporated herein by reference, an adjustable voltage regulator under control of the microcontroller applies controlled amplitude voltage to the transmitter to adjust the output amplitude of the transmitter. Also, U.S. Pat. No. 8,373,125 entitled Occupancy Detector Switch by inventor Ni, issued assigned Feb. 12, 2013, to Wenzhou Mtic Electric Appliances Company Limited, teaches a control unit configured to enable an ON state of a device under control of the sensor switch for a period of time depending on a duration and a strength of the signal from the infrared sensor, the disclosure of which is incorporated herein by reference.

U.S. Pat. No. 7,791,282 entitled Motion Sensor Switch For 3-Way Light Circuit And Method Of Lighting Control Using The Same issued Sep. 7, 2010 by inventor Yu, the disclosure of which is incorporated by reference, provides a three-way light circuit where at least one of the switches in the three-way light circuit includes an occupancy sensor. U.S. Pat. No. 7,411,489 entitled Self-Adjusting Dual Technology Occupancy Sensor System And Method assigned to Cooper Wiring Devices Inc., by first named inventor Elwell, issued Aug. 12, 2008, the disclosure of which is incorporated herein by reference, discloses a dual infrared ultrasonic sensor that provides enhanced functionality. U.S. Pat. No. 7,155,317 entitled Occupant Counter Control Switch For Automatic Turning On And Off Electrical Appliances In A Room by inventor Nhan Tran issued Dec. 26, 2006 provides a countdown for deactivating room lights, the disclosure of which is incorporated herein by reference.

U.S. Pat. No. 6,888,323 by inventor Jonathan Null, entitled Light Management System Device And Method assigned to Watt Stopper Inc., the disclosure of which is incorporated herein by reference, provides a nightlight in conjunction with an occupancy sensor. Also, U.S. Pat. No. 5,189,393 entitled Dual technology motion sensor by inventor Hu also assigned to The Watt Stopper Inc., the disclosure of which is incorporated herein by reference, also provides a dual infrared and ultrasonic sensor.

SUMMARY OF THE INVENTION

The above references described in the prior art lack a way to retrofit existing circuitry to add a second lighting control circuitry and a handheld or wall mounted remote control while keeping the original single circuitry and all sensor(s) functions. The present invention provides a retrofit system for existing circuitry to upgrade the existing circuitry. In the present invention there is no need for any firmware changes, but firmware changes can provide improved performance beyond current standards such as the California Title 24 2013 Building Energy Efficiency Standard, for example. With proper wiring and installation by a certified electrician, the present invention Two Circuit Lighting Controller with Sensors and Radio Frequency (RF) Remote Control could easily comply with new standards such as the California Title 24 2013 Building Energy Efficiency Standard.

Many prior art lighting controllers with built-in sensors and timers can control only a single circuit. In the present invention, a particular single circuit lighting controller is used as an example. However, the same principles apply to all other single circuitry with similar sensor or sensors and internal microcontroller with firmware to control timing and switching ON or OFF the AC output to source a lighting circuitry.

A lighting controller comprising a single circuit sensor switch on a first circuit. At least one infrared PIR sensor is configured to cover 360 degrees. The at least one infrared PIR sensor is electrically connected to control the single circuit sensor switch. An acoustic sensor is electrically connected to control the single circuit sensor switch. A photo sensor is electrically connected to control the single circuit sensor switch. The photo sensor has an infrared remote controller and receiver for controlling the single circuit sensor switch. A second circuit sensor switch is on a second circuit that is connected to the first sensor. The second circuit sensor switch is configured to be connected to the single circuit sensor switch, the photo sensor, the acoustic sensor, and the at least one infrared PIR sensor so that the second circuit sensor switch further improves lighting efficiency.

An added RF receiver module has a power source +5 VDC enabled only after a first circuit relay is activated when the at least one infrared PIR sensor detects motion in the target vicinity to turn on the first circuit and power up half of lamps controlled by the lighting controller. The second circuit sensor switch has a second relay driving an NPN transistor configured to turn ON or OFF a second circuit AC power source via an added RF receiver module, and wherein the added RF receiver module operates at either 315 MHz or 2.4 MHz having firmware configured to communicate with an added RF transmitter module to control a second circuit relay.

The RF Receiver Module has a first digital output control logic signal and a second digital output control logic signal. The second digital output control logic signal disables the first circuit relay that drives the NPN transistor so that it acts as a toggle switch for the first circuit AC power source. The RF remote transmitter has a power button to turn on or off the lamps controlled by the first circuit sensor switch. Once the first circuit is activated, only half of the lamps controlled by the lighting controller are turned on. The RF remote transmitter has a power button to turn on or off the lamps controlled by the second circuit sensor switch. The acoustic sensor is configured to activate only after the PIR sensors have detected motion and the PIR sensors have activated the first circuit. The acoustic sensor maintains activation of the first circuit, when sound is detected, even if the PIR sensor does not sense motion.

The microcontroller firmware is configured to read a potentiometer value to determine the desired timeout duration. The microcontroller firmware is configured to turn off the first circuit and the second circuit when no occupants are detected by the PIR sensors or the acoustic sensor within a timeout period. The disclosed new design circuitry as shown in the block of "Added RF Remote Control" has only 5 wires to connect to the original 1$^{st}$ circuitry design and does not require any Microcontroller firmware changes. The original first circuitry functions are maintained including the 3 Infrared PIR sensors, acoustic sensor, photo sensor, Infrared (IR) communication with an IR Receiver onboard and a handheld IR Transmitter.

The built-in adjustable photo sensor can detect ambient light levels to avoid turning on the first circuitry lighting devices to save electrical energy when the existing ambient light is determined to be sufficient. The manually adjustable potentiometer are labeled "LUX" to adjust photo sensor threshold level (Ambient Light Sensing). The lights will be turned off if ambient light level is above this adjusted threshold level to save energy. An adjustable timeout duration labeled "TIME" can adjust a time out duration, and the lighting controller turns off lamps after the a time out duration lapses.

A PIR sensor sensitivity level adjustment labeled "SENS" adjusts a PIR triggering sensitivity to avoid miss-triggers. The RF remote controls are battery operated and handheld. The RF receiver module is replaced with an ultrasonic sensor module that works on a Doppler shift principle to detect any movement. The ultrasonic sensor module is connected to a second circuitry lighting load and only turned on after the first circuit is turned on. The RF receiver module is replaced with a microwave sensor module using a RADAR principle to detect movement, and a lamp is connected to the second circuit is turned on only after the first circuit is turned on.

CALL OUT LIST OF ELEMENTS

101 Mechanical Relay
102 Off-Line Switcher Circuitry
103 +12 VDC Power
104 +5 VDC Power Source
105 Resistor R3
105A Standard Low Power 5 VDC Linear Regulator
106 Relay Reverse Diode D3
108 AC Line Output1
107 NPN Transistor Q1
108 PNP Transistor Q4
109 +3.3 VDC Power Source
110 NPN Transistor Q3
110 Second Circuitry Relay called Relay2
111 NPN Transistor Q5
112 Relay Reverse Diode D4
113 4.7K Ohm Resistor R4
114 NPN Transistor Q6
115 Series Base Resistor 3K Ohm R5
116 AC Line Output2
117 Radio Frequency RF Receiver Module (FIG. 6)
201 Microcontroller U2
202 3.3V-ON
203 "SENS" Potentiometer
204 "TIME" Potentiometer
205 "LUX" Potentiometer
206 Relay1-ON
301 Microphone Mic1
401 PIR1 (Pyroelectric Infrared Radial sensors)
402 PIR2
403 PIR3
501 Ambient Lighting Photo Sensor PS1
502 Infrared Receiver Transistor IR-Q1
503 Red LED called LED1

DETAILED DESCRIPTION OF THE PREFERRED EMBODIMENT

Photosensor: A sensor for sensing photons.

Figure 1:
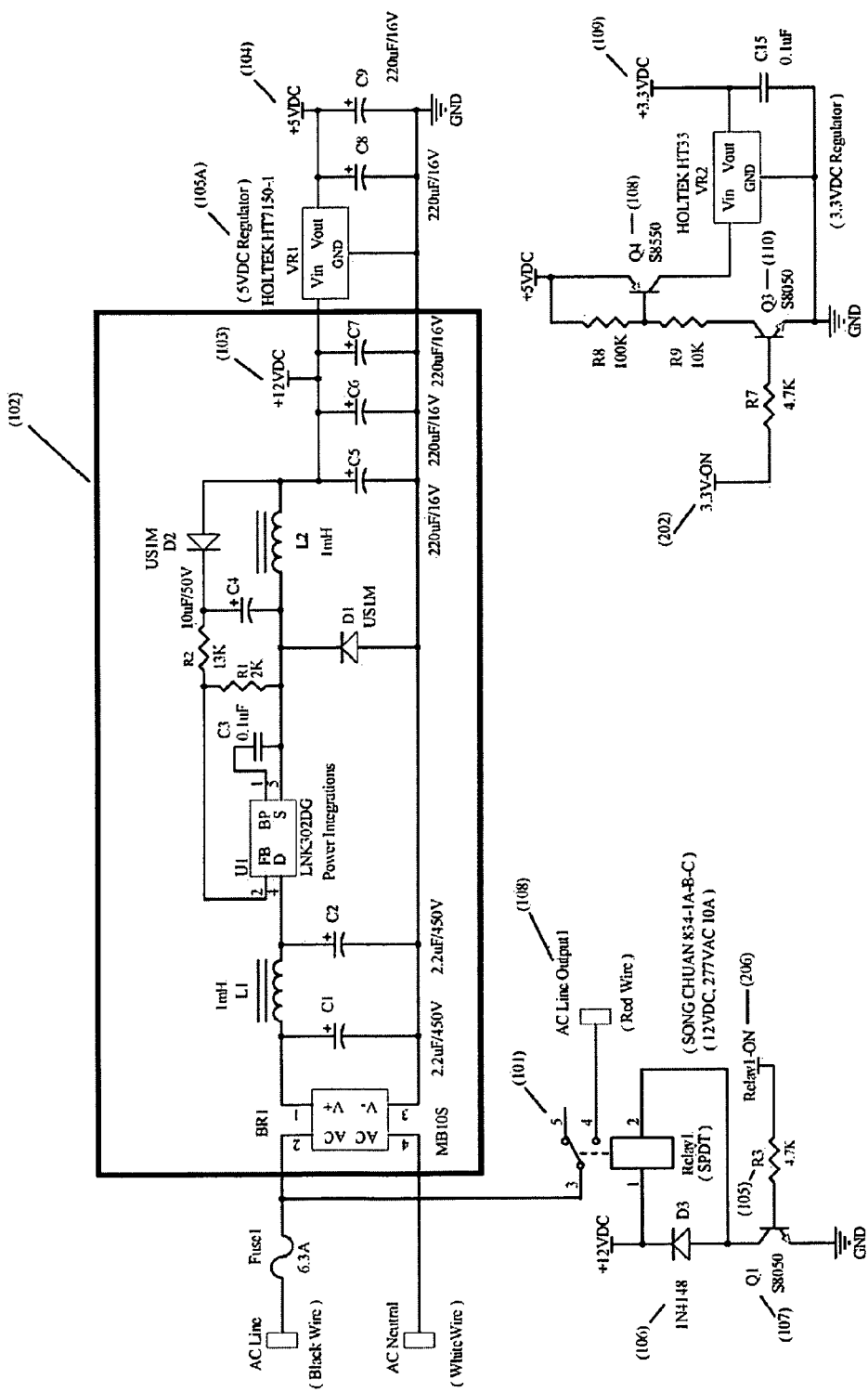
FIG. 1 is a circuit diagram of a single lighting controller.

The sample single lighting controller selected is Eucontrols Corp's lighting controlling PIR sensor and the model number is S-806. The S-806 can be a ceiling mount single circuitry lighting controller. A mechanical relay (101) can switch on the AC Line Output1 (108) to power up a lighting circuitry as seen in FIG. 1.

The mechanical relay (101) coil can be energized by turning on NPN transistor Q1 (107) via the signal Relay1-ON (206) which comes from the microcontroller U2 (201) output port P0.2. When port P0.2 is turned on to high by the internal firmware, the current goes through resistor R3 (105) will turn on NPN Transistor Q1 (107) to energize Relay1 (101) to connect the AC LINE power source to AC Line Output1 red wire (108). The relay reverse diode D3 (106) is 1N4148, which will suppress the relay coil and reverse high spike voltage.

Figure 2:
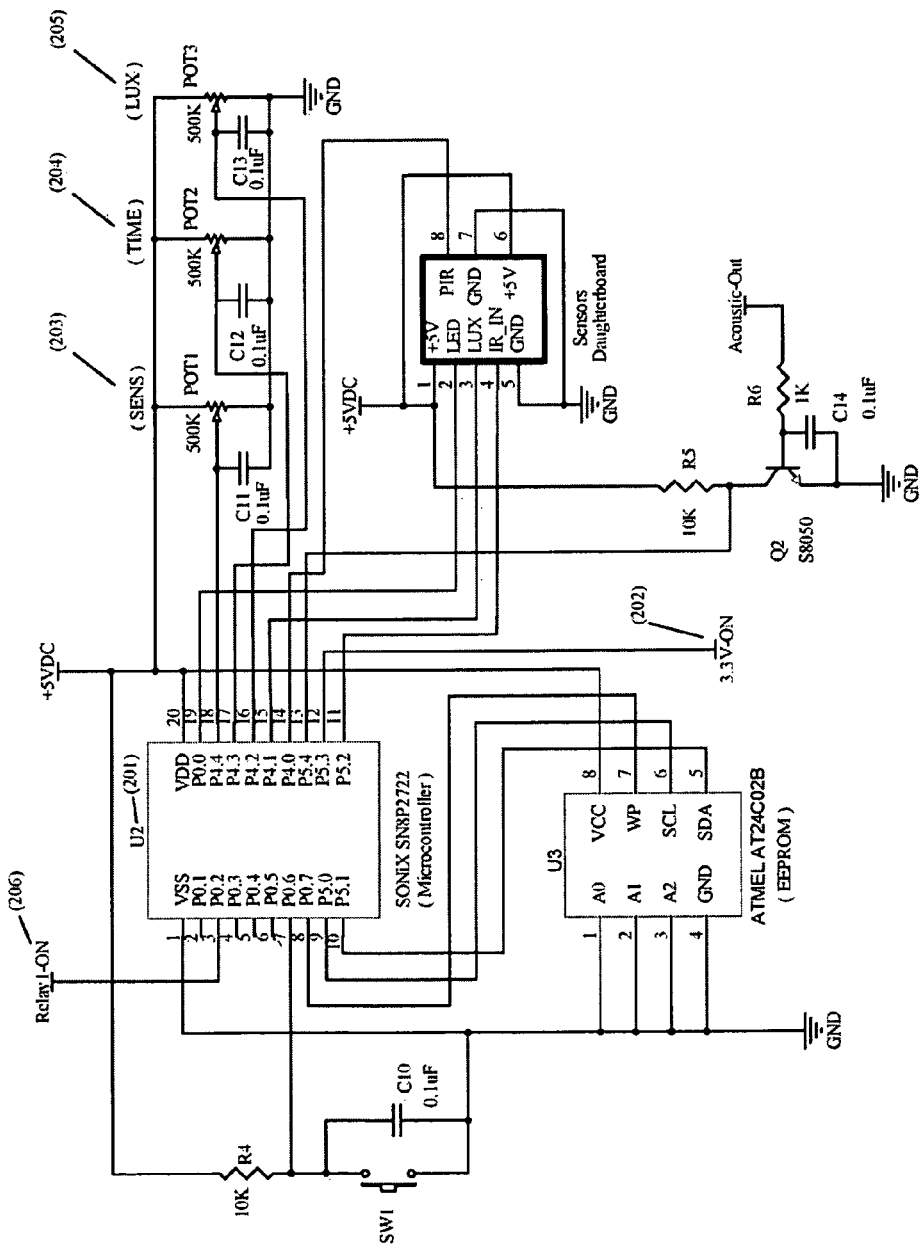
FIG. 2 is a circuit diagram showing the daughterboard, microcontroller and EEPROM.
Figure 3:
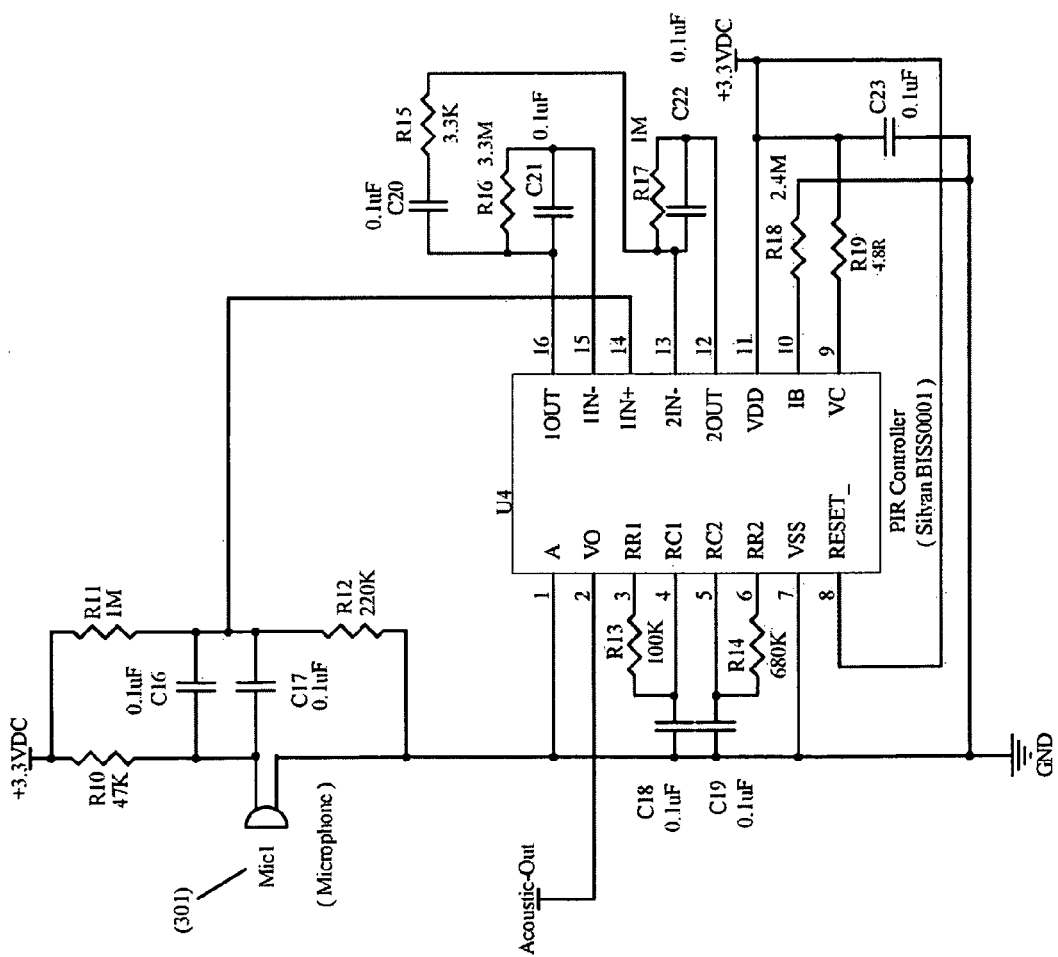
FIG. 3 is a circuit diagram showing the Acoustic Sensor using a PIR controller as an amplifier.

An Off-Line switcher circuitry (102) converts AC input power 120-277 VAC, 50 or 60 Hz to a low voltage +12 VDC power (103). The +12 VDC is used to power the mechanical relay (101) to output AC LINE power to the lighting circuitry. The +12 VDC is also regulated to a +5 VDC power source (104) by a standard low power Linear Regulator (105A) to power up the Microcontroller U2 (201) with proprietary or nonproprietary firmware to control the system as seen in FIG. 2. Thus, whenever the AC input power source is present, the +12 VDC (103) and +5 VDC (104) are available.

A second +3.3 VDC power source (109), is also regulated from the +5 VDC (104). However, the +3.3 VDC (109) is controlled by the Microcontroller U2 (201) with an output port P5.3 pin signal name 3.3V-ON (202) to turn on an NPN Transistor Q3 (110) and a PNP Transistor Q4 (108) "Transistors pair" as a switch ON/OFF device for the +3.3 VDC (109).

Several sensors are installed in a raised daughterboard located inside of the package which can be formed as a convex plastic shaped cover that can be dome shaped. The dome shaped semispherical plastic cover preferably covers the center of the S-806 package. The dome allows infrared and regular visible light to pass through and then redirect toward the sensors. The sensors can receive stronger signals in the dome due to the fresnel nature of the dome.

Figure 4:
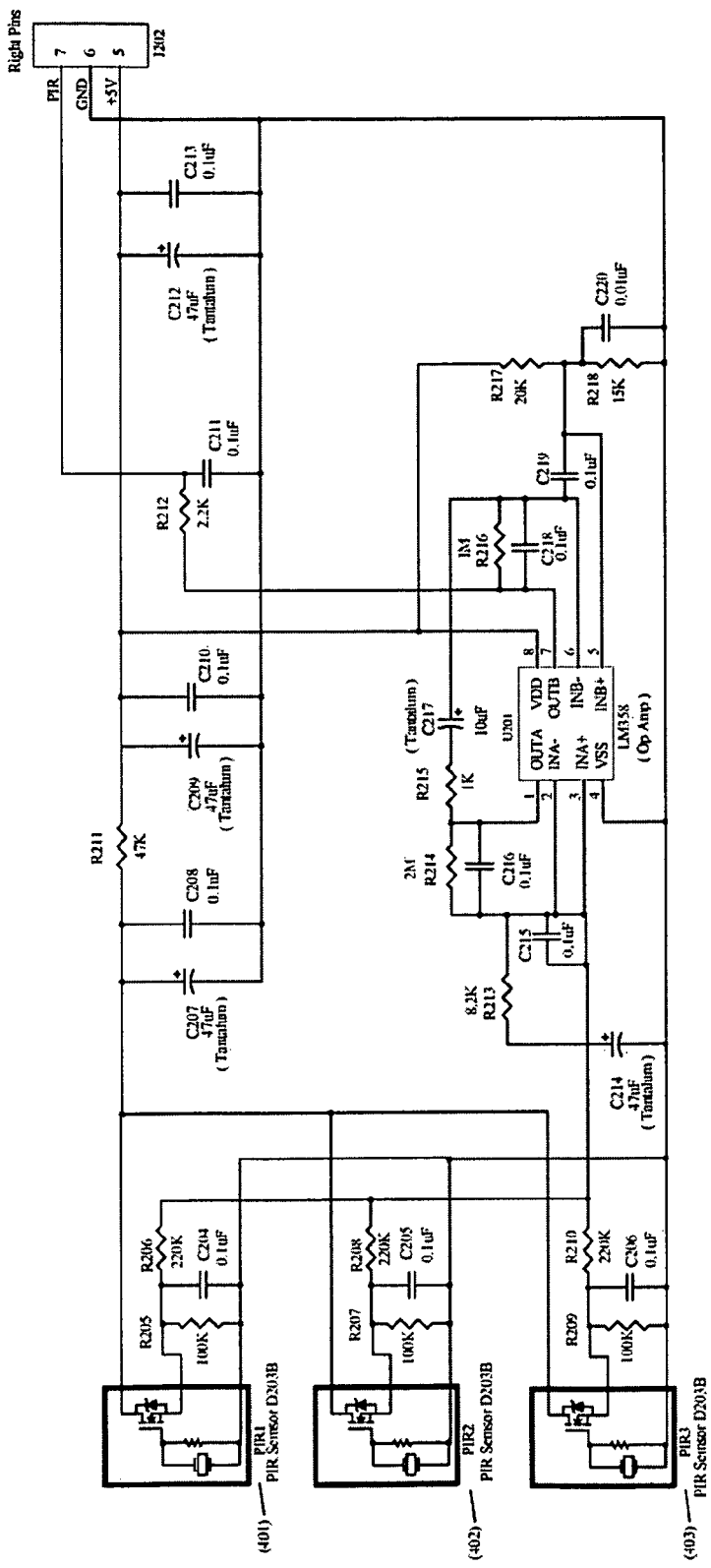
FIG. 4 is a circuit diagram showing the arrangement of the 3 PIR sensors and their connections with the J202 Right Pins.
Figure 5:
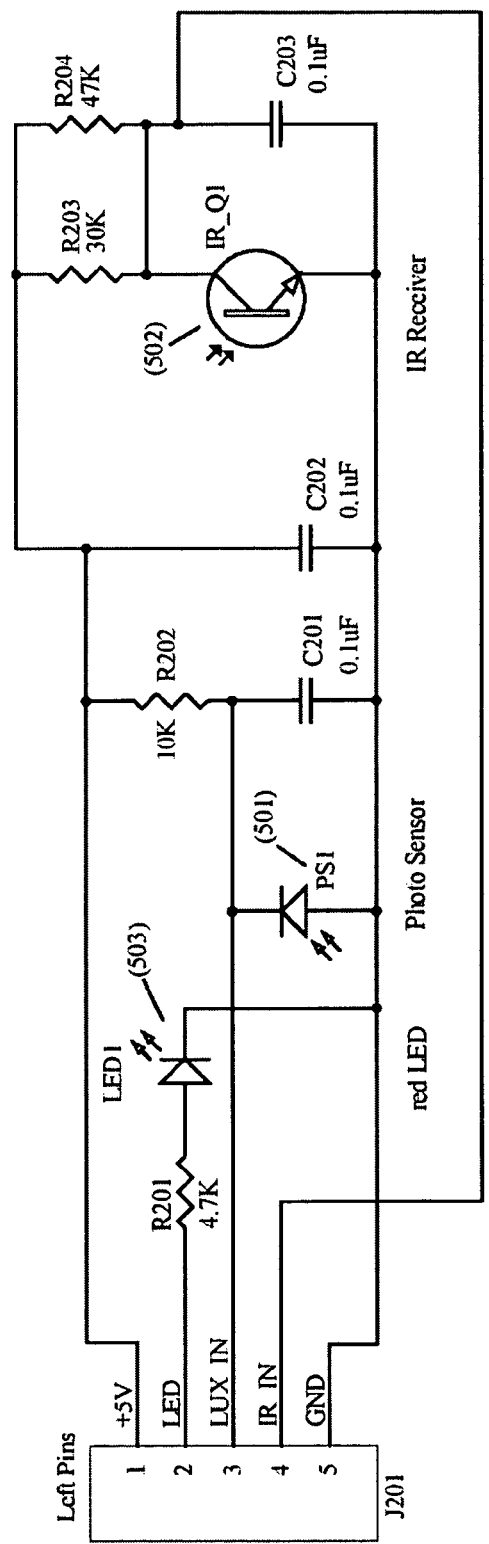
FIG. 5 is a circuit diagram showing the infrared receiver and photosensor configuration.

Three Pyroelectric Infrared Radial (PIR) sensors PIR1 (401), PIR2 (402) and PIR3 (403) can be installed on the raised daughterboard, as seen in FIG. 4, and oriented in 120 degree angles from each other to form a full 360 degrees of infrared detection. These three PIR sensors are used as a motion detector to sense any occupants moving in vicinity. If occupants are nearby and moving, the PIR sensors can sense occupant body heat as an infrared light signal to trigger the microcontroller U2 (201) firmware to activate the lighting device by turning on the relay (101). The sensitivity of the PIR sensors can be adjusted by turning a circular knob labeled "SENS" such as with a small screw driver as seen on the circuit diagram schematic "SENS" Potentiometer (203).

If occupants are present but not moving, the "acoustic sensor" can sense the occupants using small microphone Mid 1 (301) to "listen" to any sound coming from occupant activity. The acoustic sensor is powered by the +3.3 VDC power source. The +3.3 VDC is unavailable until the PIR sensors first detect infrared signals from occupants, then the Microcontroller U2 (201) can turn on the +3.3 VDC to enable the acoustic sensor Mic1 (301) by output a logic "1" or 3.3 VDC on port P5.3 3.3V-ON signal (202). When occupants come close to the S-806 ceiling mount sensor switch, the PIR sensors (401, 402, 403) can detect and turn on the lighting circuit for an automated light turn on function. A user adjustable circular knob labeled "TIME" allows adjustment of the timeout parameter from 10 seconds to 30 minutes with for example a small screw driver. The circuit diagram also shows a schematic with the "TIME" Potentiometer (204).

If no motion is detected by PIR sensors (401, 402, 403), or no sounds detected by the acoustic sensor Mic1 (301) and the selected timeout has elapsed, then the relay will be turned off by the Microcontroller U2 (201) turning Port P0.2 Relay1-ON signal (206) to logic "0" or 0 VDC, to save Electricity energy. Before the selected timeout has elapsed, if any of the PIR sensors (401, 402, 403) or the acoustic sensors Mid1 (301) is triggered by infrared or acoustic sounds, the timeout counter is reset by the microcontroller U2 (201) and the timeout countdown process will restart. Restarting the timeout countdown maintains the lighting circuit power on continuously, until the next timeout elapses during a length of time without a timeout countdown restart.

Another ambient lighting photo sensor PS1 (501) senses the ambient visible light nearby. The photosensor detects daylight. During daytime with high natural ambient light, the Microcontroller U2 (201) can read this photo sensor PS1 (501) to turn off the lighting circuit to save energy when the natural ambient light level is high enough. There is a user adjustable circular knob labeled "LUX" to adjust triggering ambient light level from 10 LUX to 2000 LUX such as by a small screw driver. This knob is shown on the circuit diagram schematic as "LUX" Potentiometer (205).

The present invention includes an infrared receiver transistor IR-Q1 (502), and a red LED called LED1 (503). A commercial available handheld Infrared remote controller with compatible firmware can be use to send command to this sensor switch via the infrared receiver transistor IR-Q1 (502). The Microcontroller U2 (201) can respond to infrared data received by blinking the red LED called LED1 (503).

The detailed description of the preferred embodiment uses the EuControls S-806 as a best mode example for retrofitting with a second lighting circuit with a radio frequency RF receiver module (117). The design implementation for added second circuit and RF remote allow for all original design features to be maintained without a microcontroller U2 (201) firmware upgrade. A working prototype demonstrated that only five wires need to be interconnected between the prior art EuControls S-806 and the prototype breadboard.

New components and functions include the RF receiver module (117) which can be implemented by selecting from parts such as EPtronics Inc. part number LCM-1C09-RF 2.4 GHz or any other commercial available RF Receiver board, such as brand name AOKE model number AK-RKB12-X, or Adafruit product ID 1096 Simple RF M4 Receiver 315 MHz. The receiver module generally includes 7 input/output I/O pins:

GND: system ground.
+5V: +5 VDC input power source.
D0: Data 0
D1: Data 1
D2: Data 2
D3: Data 3
VT: output +5 VDC whenever any of D0 to D3 receives signals.

A second circuit relay called Relay2 (110) is a 12 VDC coil operated mechanical relay switch having incoming power AC LINE, and relay output to the second lighting AC Line Output2 power input. The relay coil is driven by an NPN Transistor Q5 (111) and is configured in parallel with a diode 1N4148 D4 (112) to suppress reverse high voltage when turning off the relay coil. There is a 4.7K Ohm resistor R4 (113) connected from the RF receiver module (117) D1 pin to this NPN Transistor Q5 (111) base electrode. Whenever the RF receiver receives a channel 1 signal on D1, the data D1 will go high to +5 VDC to turn on the NPN transistor Q5 (111) and the relay Relay2 (110).

The first circuit toggles whenever the RF receiver module (117) receives a channel 3 signal on D3, the data D3 will go high to +5 VDC to turn on another NPN transistor Q6 (114) with a series base resistor 3K Ohm R5 (115). The collector electrode of this second NPN transistor Q6 (114) is connected to the base electrode of the first NPN transistor Q1 (107) to turn OFF the original first relay Relay1 (101).

The RF Receiver Module (117) pin 2 receives +5 VDC power source from microcontroller U2 (201) pin 3, Port P0.2 Relay1-ON signal (206) which is used to turn ON the first relay Relay1 (101). The P0.2 is an output port, which can source an 8 mA current minimum. The RF receiver module (117) runs at less than 5 mA. When the PIR sensors trigger the original first relay ON, by sending +5 VDC to port P0.2, the same P0.2 signal is then also energized by the receiver module (117).

Therefore, the original first circuit is turned ON, but the newly added second circuitry is waiting for PIR sensors to detect motion. If any infrared signal is received by 1 or more PIR sensors (401, 402 and 403), the microcontroller will turn on the first circuit. At the same time, the RF receiver board also receives power and it is waiting for an RF signal for channel 1 and channel 3.

If the RF Receiver Module (117) channel 1 D1 received data, then the second relay Relay2 (110) will be turned ON to power up the lighting circuitry 2 from the blue wire of the switched AC Line Output2 (116). If RF Receiver Module (117) channel 1 D1 receives the next command, which is a toggle signal, the second relay Relay2 (110) will be de-energized to turn the second circuitry OFF.

If channel 3 D3 received data, then the second NPN Transistor Q6 (114) will be turned ON, which will short the first NPN Transistor Q1 (107) base electrode to ground.

Then the first relay Relay1 (101) will be de-energized and turns the first circuit AC line Output1 power OFF. If channel 3 D3 received next command, which is a toggle signal, the first relay Relay1 (101) will be re-energized to turn the first circuit ON again.

Please note that, when the first relay Relay1 (101) is turned OFF by shorting the first NPN Transistor Q1 (107) base electrode to ground, the microcontroller port P0.2 is still at logic 1 or +5 VDC. Then the RF Receiver board is still receiving +5 VDC power, the second relay Relay2 (110) stays on, and second circuitry still have AC Line Output2 power through relay Relay2.

With a standard 4-channel RF Receiver Module (117), we can control the first circuit and the second circuit independently, until the preselected timeout elapses if no PIR (401, 402 and 403) or acoustic sensor Mid (301) detects any infrared or acoustic sound. The added component is the RF Receiver Module (117).

With this configuration, when an occupant enters the room with both circuits turned OFF, the PIR sensors (401, 502, 403) will detect infrared and the microcontroller will turn ON the first relay Relay1 (101). At the same time, the RF Receiver Module (117) will receive a +5 VDC power source from Relay1-ON signal (206) and start monitoring the RF signal on the D1 and D3 data lines. The user can use a handheld RF remote control to turn ON or OFF any of the two circuit lighting devices. When a timeout elapses with no occupancy motion detected, the first circuit will be turned OFF by Microcontroller sending logic "0" or 0 VDC at port P0.2 Relay1-ON signal (206), the RF Receiver Module (117) will lose the +5 VDC power source which will turn OFF both circuits to save energy and improve lighting efficiency such as by complying with California Title 24 requirements.

Figure 6:
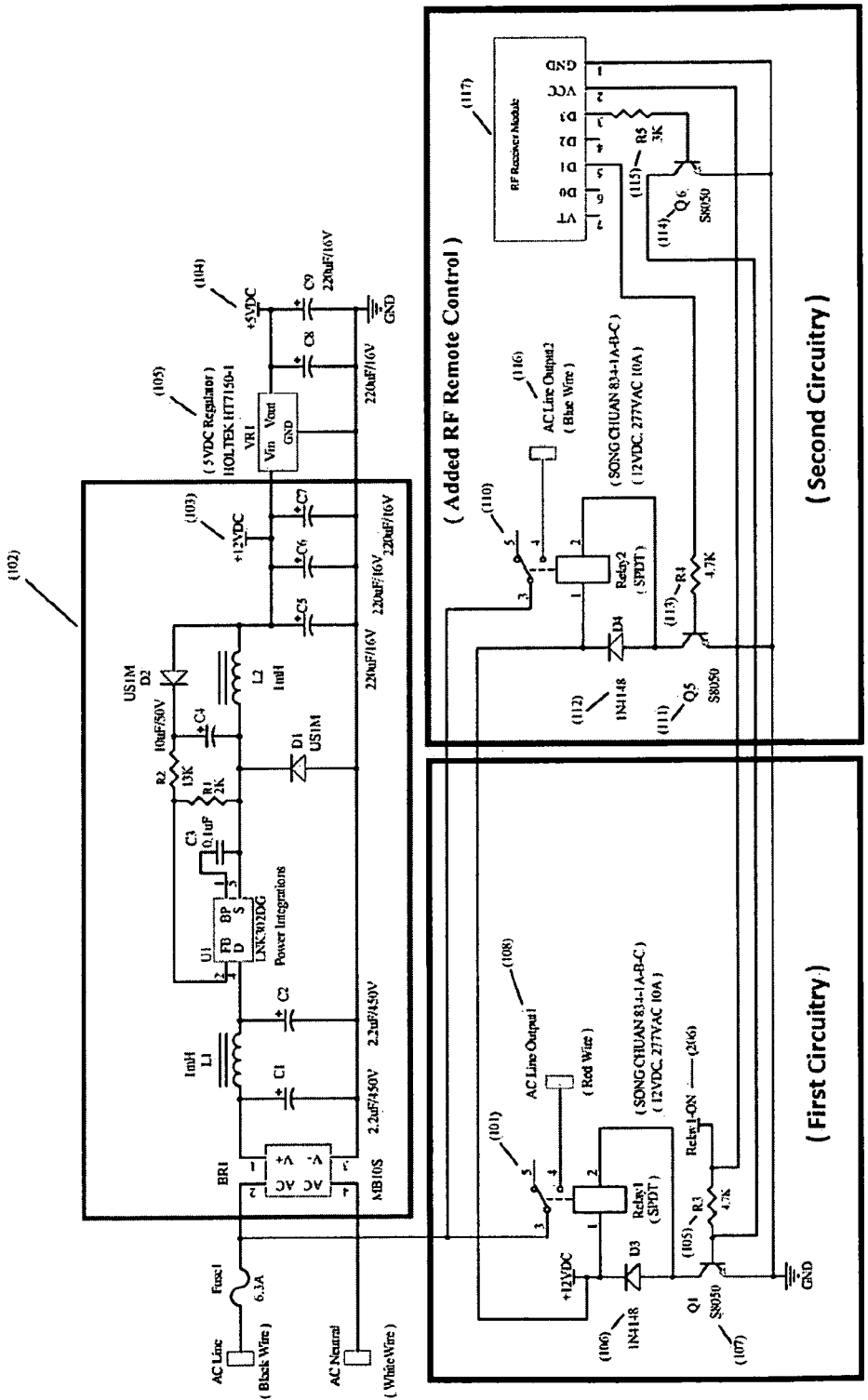
FIG. 6 is a circuit diagram showing the first circuitry and the added RF Remote Control as the second circuitry.

The added RF remote control is preferably added using a total of no more than five connections. As seen in FIG. 6, the first connection connects from the AC Line black wire between the first fuse and AC line input of the mechanical relay (101). The second connection connects from between the D4 diode of the second relay Relay2 (SPDT) near the first pin of the second relay and the D3 diode on the first relay near the first pin of the first relay. The third connection is made between the VCC of RF receiver module (117) and relay 1-ON (206) before the R3 4.7 k resistor (105). The fourth connection is between the NPN Transistor Q6 (114) of the RF receiver module and the junction between the R3 4.7 k resistor (105) and the NPN Transistor Q1 (107). The fifth connection is between the ground pin on the RF receiver module and the ground on the NPN Transistor Q1 (107). The added RF remote control is called the second circuit which is the circuit that is added. The added RF remote control circuit is connected at the above-mentioned five junctions and can be retrofitted to these five junctions.

The invention claimed is:

1. A lighting controller comprising:
a single circuit sensor switch on a first circuit;
at least one passive infrared sensor (PIR) that is configured to cover 360 degrees of infrared detection, wherein the at least one PIR sensor is electrically connected to control the single circuit sensor switch;
an acoustic sensor, wherein the acoustic sensor is electrically connected to control the single circuit sensor switch;
a photo sensor, wherein the photo sensor is electrically connected to control the single circuit sensor switch, wherein the photo sensor has a receiver controlled by an infrared remote controller for controlling the single circuit sensor switch; and
a second circuit sensor switch on a second circuit, wherein the second circuit is connected to the first circuit, wherein the second circuit sensor switch is configured being connected to the single circuit sensor switch, the photo sensor, the acoustic sensor, and the at least one PIR sensor, whereby the second circuit sensor switch further improves lighting efficiency;
an added RF receiver module having a power source +5 VDC enabled only after a first circuit relay is activated when the at least one PIR sensor detects motion in the target vicinity to turn on the first circuit and power up half of lamps controlled by the lighting controller.

2. The lighting controller of claim 1, wherein the second circuit sensor switch has a second relay driving an NPN transistor configured to turn ON or OFF a second circuit AC power source via an added RF receiver module, and wherein the added RF receiver module operates at either 315 MHz or 2.4 MHz having firmware configured to communicate with an added RF transmitter module to control a second circuit relay.

3. The lighting controller of claim 1, wherein the RF receiver module has a first digital output control logic signal and a second digital output control logic signal, wherein the second digital output control logic signal disables the first circuit relay that drives the NPN transistor so that it acts as a toggle switch for the first circuit AC power source.

4. The lighting controller of claim 3, wherein the RF remote transmitter has a power button to turn on or off the lamps controlled by the first circuit sensor switch.

5. The lighting controller of claim 1, wherein once the first circuit is activated, only half of the lamps controlled by the lighting controller are turned on, wherein the RF remote transmitter has a power button to turn on or off the lamps controlled by the second circuit sensor switch.

6. The lighting controller of claim 1, wherein the acoustic sensor is configured to activate only after the PIR sensors have detected motion and the PIR sensors have activated the first circuit, wherein the acoustic sensor maintains activation of the first circuit, when sound is detected, even when the PIR sensors do not sense motion.

7. The lighting controller of claim 1, wherein a microcontroller firmware is configured to read a potentiometer value to determine a desired timeout duration; and wherein the microcontroller firmware is configured to turn off the first circuit and the second circuit when no occupants are detected by the PIR sensors or the acoustic sensor within a timeout period.

8. The lighting controller of claim 1, wherein a disclosed new design circuitry as shown in the block of "Added RF Remote Control" has only five wires to connect to the first circuit and does not require any microcontroller firmware changes.

9. The lighting controller of claim 1, wherein the at least one PIR sensor includes three PIR sensors, wherein an original first circuitry functions are maintained including the three PIR sensors, the acoustic sensor, the photo sensor, and an infrared (IR) communication with an IR receiver onboard and a handheld IR transmitter.

10. The lighting controller of claim 1, wherein a built-in adjustable photo sensor can detect ambient light levels to avoid turning on the first circuitry lighting devices to save electrical energy when the existing ambient light is determined to be sufficient.

11. The lighting controller of claim 1, further including a manually adjustable potentiometer labeled "LUX" to adjust photo sensor threshold level (Ambient Light Sensing), the lights will be turned off when ambient light level is above this adjusted threshold level to save electrical energy.

12. The lighting controller of claim 1, further including an adjustable timeout duration labeled "TIME" to adjust a time out duration, wherein the lighting controller turns off lamps after the a time out duration lapses.

13. The lighting controller of claim 1, further including a PIR sensor sensitivity level adjustment labeled "SENS" to adjust a PIR triggering sensitivity to avoid miss-triggers.

14. The lighting controller of claim 1, wherein the RF remote controls are battery operated and handheld.

15. The lighting controller of claim 1, wherein the RF receiver module is replaced with an ultrasonic sensor module that works on a Doppler shift principle to detect any movement, wherein the ultrasonic sensor module is connected to a second circuitry lighting load and only turned on after the first circuit is turned on.

16. The lighting controller of claim 1, wherein the RF receiver module is replaced with a microwave sensor module using a RADAR principle to detect movement, and wherein a lamp connected to the second circuit is turned on only after the first circuit is turned on.

* * * * *